Patented Feb. 19, 1946

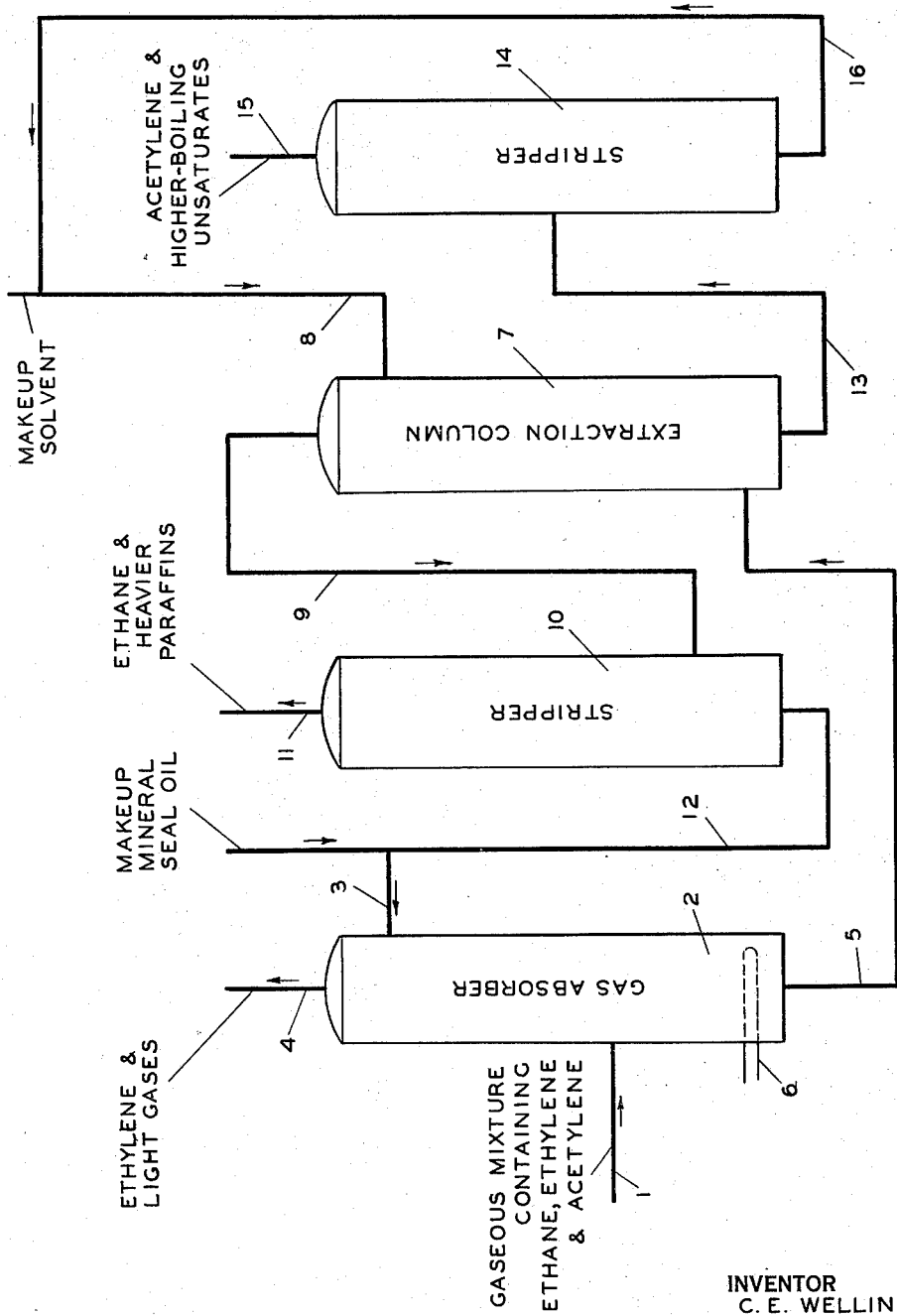

2,395,362

UNITED STATES PATENT OFFICE 2,395,362

SEPARATION OF HYDROCARBONS

Charles E. Welling, Wilkinsburg, Pa., assignor to Phillips Petroleum Company, a corporation of Delaware Application May 15, 1944, Serial No. 535,692

9 Claims. (Cl. 183—115)

This invention relates to the separation of ethane, ethylene and acetylene from a gaseous mixture containing the same with or without hydrocarbons or other components, chiefly hydrogen, boiling below ethylene and hydrocarbons, saturated or unsaturated or both, boiling above acetylene.

The object of this invention is to provide an improved method of separating a gaseous mixture containing ethane, ethylene and acetylene into fractions rich in ethane, ethylene and acetylene. Another object is to provide such a process which can be carried out in a simple and economical manner. Another object is to provide a process of the above type wherein the necessity of using low temperatures with excessive refrigeration requirements is eliminated. Another object is to provide such a process which is adapted to continuous operation over long periods of time and wherein the stripped solvents are adapted to be reused directly in their respective steps. Numerous other objects will hereinafter appear.

The accompanying drawing portrays diagrammatically one arrangement of equipment which may be used in carrying out the present invention. In the first step of the process the gaseous mixture entering via line 1 is passed upwardly in gas absorber 2, countercurrently to a downward-flowing high-boiling paraffinic liquid, such as mineral seal oil, gas oil, medicinal white oil, or a similar paraffinic oil that is essentially nonvolatile and is not miscible with the solvent of the subsequent extraction step. The oil is fed in via line 3. The ethylene and any lower-boiling gases issue from the top of the gas absorber 2 via line 4. The temperature in the gas absorber 2 is preferably in the range of 25 to 125° F. and the pressure may be up to about 800 pounds per square inch absolute. Operating conditions of temperature and pressure are adjusted with regard to the exact composition of the gaseous feed to the absorber 2 and to the mol ratio of gaseous feed to lean absorber oil. Operation is aimed at making a separation of ethylene and all lighter constituents overhead, while ethane, acetylene, and heavier constituents are dissolved in the absorption oil and pass out the kettle of the absorber via line 5. This separation may be improved by the use of a heating or reboiling coil 6 in the bottom of the gas absorber 2 to partly strip the enriched oil of dissolved material; the resulting vapor ascends the absorber 2 in countercurrent relationship to the descending oil.

The enriched oil, containing ethane and acetylene with any heavier paraffinic and/or unsaturated compounds that may be present, is withdrawn from the bottom of the absorber via line 5 and is passed to a liquid-liquid extraction column 7, wherein the acetylene and other unsaturated hydrocarbons are extracted from the oil by liquid-liquid extraction with a selective solvent introduced via line 8. Suitable selective solvents include furfural, dimethyl formamide, sulfur dioxide, aniline, nitrobenzene, levulinic acid, and other known solvents that have the property of selectively dissolving unsaturated compounds.

The temperature in the liquid-liquid extraction column 7 is in the range of 50 to 175° F., and the pressure is sufficient to maintain liquid-phase conditions. The oil, after contact with the solvent, is passed via line 9 to a stripper 10 where, at higher temperatures and under lower pressure, the ethane and any higher-boiling paraffins are removed, leaving via line 11. The oil is cooled and is recycled to the gas absorber 2 via line 12. The selective solvent, after contact with the enriched oil, is withdrawn from the bottom of the extraction column 7 via line 13 and is passed to a stripper 14 wherein the acetylene and any higher-boiling unsaturated compounds are stripped from the solvent and taken off as an overhead product via line 15. The selective solvent, stripped of light hydrocarbons, is withdrawn from the bottom of the stripper and, after being cooled, is returned to the extraction column 7 via line 16.

Among the advantages of this invention are:

1. It affords a new and improved method, which eliminates the necessity of very low temperature in applying liquid-liquid extraction to effect separation of acetylene from ethane. The necessity of very low temperatures is eliminated because the presence of the absorber oil as a diluent in the de-ethylenized mixture raises both the critical temperature of the mixture and the critical solution temperature with the selective solvent of the extraction step.

2. It takes advantage of the relatively low boiling point of ethylene to remove ethylene without use of fractionation, which would require excessive refrigeration. This removal of ethylene has the advantage of eliminating a compound whose extractability lies between ethane and acetylene and consequently simplifies the subsequent liquid-liquid extraction of acetylene.

3. The removal of materials lighter than ethylene with the ethylene reduces the vapor pressure of the rich oil charged to the liquid-liquid extraction step.

4. Stripping of the selective solvent from the mineral oil before returning the mineral oil to the gas absorber is not required to prevent loss of the selective solvent, since the mineral oil flows in a closed cycle. Similarly, there is no necessity to strip any dissolved mineral oil from the selective solvent leaving the liquid-liquid extraction column.

*Example*

A gaseous mixture of the following composition,

|                      | Vol. per cent |
|----------------------|---------------|
| Methane and lighter  | 29            |
| Ethylene             | 14            |
| Ethane               | 50            |
| Acetylene            | 6             |
| $C_3$ hydrocarbons   | 1             | is subjected to absorption in an efficient absorber fitted with a reboiler. About 0.5 mole mineral seal oil is charged per mole of gaseous feed. The absorber is operated at about 40° F. and 700 pounds per square inch. The resulting rich absorption oil contains only 12 per cent of the ethylene, about 60 per cent of the ethane and acetylene, and nearly all of the $C_3$ hydrocarbons. From the top of the absorber there is produced an overhead stream containing ethylene in almost double the concentration in the gaseous charge to the absorber. This overhead stream has the following approximate composition,

|                      | Vol. per cent |
|----------------------|---------------|
| Methane and lighter  | 49.8          |
| Ethylene             | 21.2          |
| Ethane               | 25.8          |
| Acetylene            | 3.1           |
| $C_3$ hydrocarbons   | 0.1           |

The rich oil is then brought into countercurrent contact with furfural at about 60° F. and at a pressure high enough to prevent any vapor formation. Upon stripping the extracted oil, there results an ethane-rich stream, while the hydrocarbon stream resulting from stripping the selective solvent contains acetylene in more than 50 per cent purity. These two streams have the following approximate compositions, respectively,

|                      | Vol. per cent | Vol. per cent |
|----------------------|---------------|---------------|
| Methane and lighter  | 0.1           | 0.0           |
| Ethylene             | 2.0           | 14.0          |
| Ethane               | 95.3          | 24.0          |
| Acetylene            | 2.0           | 50.5          |
| $C_3$ hydrocarbons   | 0.6           | 11.5          |

Multiple operation of the process effects substantially complete separation of the ethane, ethylene, and acetylene.

I claim:

1. The process of separately recovering ethane, ethylene and acetylene from a gaseous hydrocarbon mixture containing the same which comprises intimately contacting said mixture in the gaseous state with a high-boiling paraffinic oil and thereby effecting preferential absorption in said oil of ethane and acetylene from said mixture while preferentially allowing ethylene to pass through undissolved, subjecting the rich oil to liquid-liquid extraction with a liquid solvent which selectively dissolves unsaturated in preference to saturated hydrocarbons and thereby effecting preferential solution of acetylene in said solvent while preferentially allowing ethane to remain in said oil, separating the extract and raffinate phases and recovering acetylene from the extract phase and ethane from the raffinate phase.

2. The process of separately recovering ethane, ethylene and acetylene from a gaseous hydrocarbon mixture containing the same which comprises intimately contacting said mixture in the gaseous state with a high-boiling paraffinic oil and thereby effecting preferential absorption in said oil of ethane and acetylene from said mixture while preferentially allowing ethylene to pass through undissolved, subjecting the rich oil to liquid-liquid extraction with a liquid solvent which selectively dissolves unsaturated in preference to saturated hydrocarbons and thereby effecting preferential solution of acetylene in said solvent while preferentially allowing ethane to remain in said oil, separating the extract and raffinate phases, stripping the dissolved gases including ethane from the raffinate phase and returning the stripped oil directly to the first-named contacting step without treatment to remove the dissolved content of said solvent therefrom, stripping the dissolved gases including acetylene from the extract phase and returning the stripped solvent directly to said extraction step without treatment to remove the dissolved content of said oil therefrom.

3. The process of separately recovering ethane, ethylene and acetylene from a gaseous hydrocarbon mixture containing the same which comprises intimately contacting said mixture in the gaseous state with a high-boiling paraffinic oil at a temperature of from 25 to 150° F. and at a pressure ranging up to 800 pounds per square inch absolute at which said mixture is maintained in the gaseous phase and thereby effecting preferential absorption in said oil of ethane and acetylene from said mixture while preferentially allowing ethylene to pass through undissolved, subjecting the rich oil to liquid-liquid extraction with a liquid solvent which selectively dissolves unsaturated in preference to saturated hydrocarbons and thereby effecting preferential solution of acetylene in said solvent while preferentially allowing ethane to remain in said oil, separating the extract and raffinate phases and recovering acetylene from the extract phase and ethane from the raffinate phase.

4. The process of separately recovering ethane, ethylene and acetylene from a gaseous hydrocarbon mixture containing the same which comprises intimately contacting said mixture in the gaseous state with a high-boiling paraffinic oil and thereby effecting preferential absorption in said oil of ethane and acetylene from said mixture while preferentially allowing ethylene to pass through undissolved, subjecting the rich oil to liquid-liquid extraction with a liquid solvent which selectively dissolves unsaturated in preference to saturated hydrocarbons at a temperature of from 50 to 175° F. and under a pressure sufficient to maintain liquid phase conditions and thereby effecting preferential solution of acetylene in said solvent while preferentially allowing ethane to remain in said oil, separating the extract and raffinate phases and recovering acetylene from the extract phase and ethane from the raffinate phase.

5. The process of separately recovering ethane, ethylene and acetylene from a gaseous hydrocarbon mixture containing the same which comprises intimately contacting said mixture in the gaseous state with a high-boiling paraffinic oil at a temperature of from 25 to 150° F. and at a pressure ranging up to 800 pounds per square inch absolute at which said mixture is maintained in the gaseous phase and thereby effecting preferential absorption in said oil of ethane and acetylene from said mixture while preferentially allowing ethylene to pass through undissolved, subjecting the rich oil to liquid-liquid extraction with a liquid solvent which selectively dissolves unsaturated in preference to saturated hydrocarbons at a temperature of from 50 to 150° F. and under a pressure at which liquid phase is maintained and thereby effecting preferential solution of acetylene in said solvent while preferentially allowing ethane to remain in said oil, separating the extract and raffinate phases and recovering acetylene from the extract phase and ethane from the raffinate phase.

6. The process of separately recovering ethane, ethylene and acetylene from a gaseous hydrocarbon mixture containing the same together with gases boiling below ethylene and hydrocarbons boiling above acetylene which comprises scrubbing said mixture in the gaseous state with a high-boiling paraffinic oil and thereby effecting preferential absorption in said oil of ethane and acetylene and heavier components of said mixture while preferentially allowing ethylene and lighter components of said mixture to pass through undissolved, subjecting the rich oil to liquid-liquid extraction with a liquid solvent which selectively dissolves unsaturated in preference to saturated hydrocarbons and thereby effecting preferential solution in said solvent of acetylene and any higher-boiling unsaturated hydrocarbons from said rich oil while preferentially allowing ethane and any higher-boiling paraffins to remain in said oil, separating the extract and raffinate phases from one another, and stripping each of said phases to recover acetylene and any higher-boiling unsaturated hydrocarbons from the extract phase and ethane and any higher-boiling paraffins from the raffinate phase.

7. The process of separately recovering ethane, ethylene and acetylene from a gaseous hydrocarbon mixture containing the same which comprises scrubbing said mixture with mineral seal oil and thereby effecting preferential absorption in said seal oil of ethane and acetylene from said mixture while preferentially allowing ethylene to pass through undissolved, subjecting the rich oil to liquid-liquid extraction with furfural and thereby effecting preferential solution of acetylene from said rich oil in said furfural while preferentially allowing ethane to remain in said seal oil, separating the extract and raffinate phases from each other, and recovering acetylene from the extract phase and ethane from the raffinate phase.

8. A process for separately recovering fractions rich in ethane, ethylene and acetylene from a gaseous mixture containing same which comprises intimately contacting said gaseous mixture in an absorption zone with a high-boiling paraffinic oil and thereby effecting preferential absorption in said oil of ethane and acetylene from said mixture while preferentially allowing ethylene to pass through undissolved, withdrawing the undissolved gas thereby enriched in ethylene from the absorption zone, withdrawing the resulting oil enriched in ethane and acetylene from said absorption zone, passing said enriched oil to a separate extraction zone and there liquid-liquid extracting same with a solvent selective for unsaturated hydrocarbons and thereby effecting preferential solution of acetylene in said solvent while preferentially allowing ethane to remain in said oil, and separately withdrawing from the extraction zone the resulting extract phase thereby enriched in acetylene and the resulting raffinate phase thereby enriched in ethane.

9. A process for separately recovering fractions rich in ethane, ethylene and acetylene from a gaseous mixture containing same which comprises intimately countercurrently contacting said gaseous mixture in an absorption zone with a high-boiling paraffinic oil and thereby effecting absorption in said oil of the major portion of the ethane and acetylene content of said mixture while allowing the major portion of the ethylene content of said mixture to pass through undissolved, withdrawing the undissolved gas thereby enriched in ethylene from the absorption zone, withdrawing the resulting oil enriched in ethane and acetylene from said absorption zone, passing said enriched oil to a separate extraction zone and there liquid-liquid extracting same with a solvent selective for unsaturated hydrocarbons and thereby effecting solution of the major portion of the acetylene content of said enriched oil in said solvent while allowing the major portion of the ethane content of said enriched oil to remain in said oil, and separately withdrawing from the extraction zone the resulting extract phase thereby enriched in acetylene and the resulting raffinate phase thereby enriched in ethane.

CHARLES E. WELLING.